Aug. 4, 1959    D. G. EVERHART    2,898,060
TRAILING MEMBER SPINNING ASSEMBLY
Filed Jan. 20, 1955    2 Sheets-Sheet 1

INVENTOR.
DONALD G. EVERHART
BY Julius L. Rubinstein
AGENT
and
Wade Loomis
ATTORNEY Aug. 4, 1959  D. G. EVERHART  2,898,060
TRAILING MEMBER SPINNING ASSEMBLY
Filed Jan. 20, 1955  2 Sheets-Sheet 2
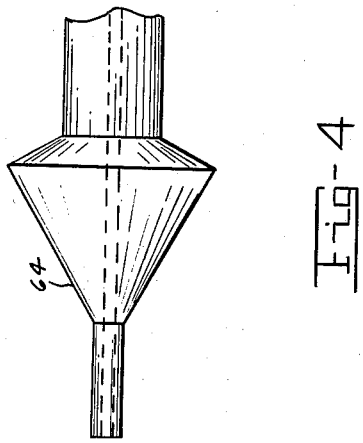
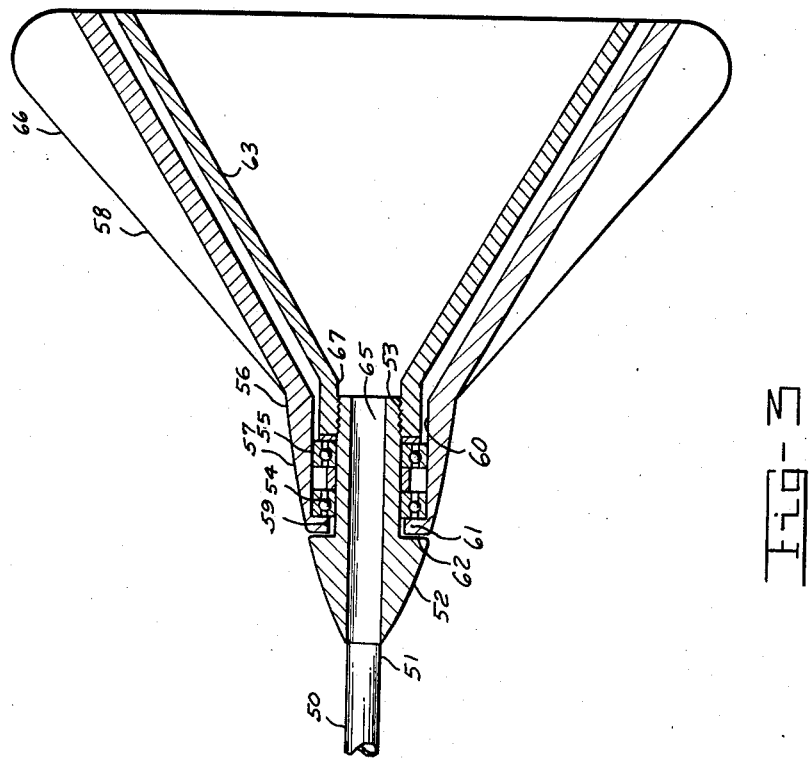
INVENTOR.
DONALD G. EVERHART

United States Patent Office 2,898,060
Patented Aug. 4, 1959

2,898,060

TRAILING MEMBER SPINNING ASSEMBLY

Donald G. Everhart, Dayton, Ohio

Application January 20, 1955, Serial No. 483,183

5 Claims. (Cl. 244—135)

(Granted under Title 35, U.S. Code (1952), sec. 266)

The invention described herein may be manufactured and used by or for the United States Government for governmental purposes without payment to me of any royalty thereon.

This invention relates to devices that are designed to trail behind moving vehicles, and more particularly to reelable antennas and refueling devices for aircraft or ships.

Antennas or refueling devices designed to trail behind aircraft or ships are widely known. Generally a device is attached to the trailing free end to create a drag and keep the trailing member in taut extension. In practice, however, turbulent fluid pressures acting on the trailing member produce erratic gyrations which may twist and break it, foul the vehicle controls, or damage the vehicle by flogging the vehicle surfaces.

It is therefore a principal object of this invention to provide a gyroscopic means for damping out erratic trailing member gyrations.

Another object of this invention is to prevent breakage of the trailing member due to twisting.

A further object of this invention is to prevent the trailing member from fouling the vehicle control surfaces.

An additional object is to prevent damage to the vehicle surfaces by trailing member flogging.

Further objects and advantages of the invention will be brought out in the following description taken in connection with the accompanying drawings and appended claims.

Fig. 3 is a side elevation of the invention adapted for use with a trailing refueling hose.

Fig. 4 is a side elevation of a refueling nozzle designed to enter the refueling passage of the spinner assembly.

Figure 1:
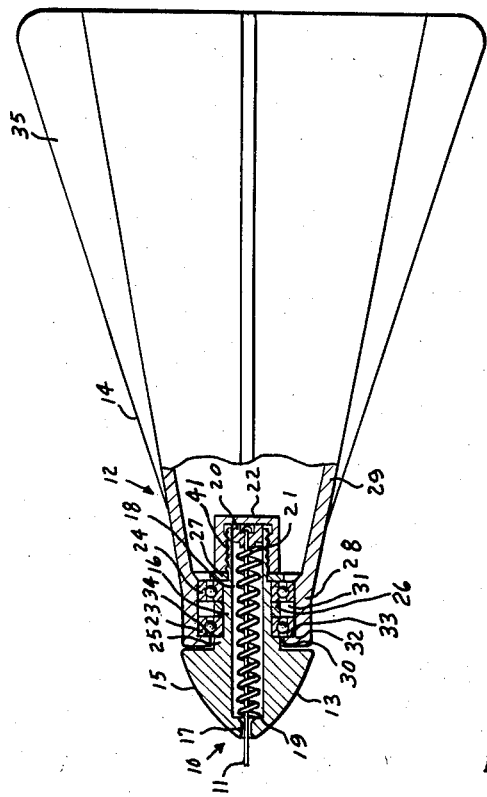
Fig. 1 is a side elevation of the invention adapted for use with a trailing antenna.

As best seen in Fig. 1 an antenna trailing member indicated generally at 10 comprises an antenna wire 11 adapted to be wound on a reel mounted in a vehicle and a spinner assembly 12. The spinner assembly comprises a pair of relatively rotatable members 13 and 14. Member 13 comprises a substantially conical forward portion and a coaxial cylindrical rearwardly extending stepped stem portion 16. An antenna wire receiving bore 17 extends along the axis of the member from the vertex of conical portion 15. A spring receiving counter bore 18 extends along the axis from the end of the stem to a point adjacent the vertex to form shoulders 19. The trailing free end of the antenna wire penetrates bore 17 and counter bore 18 and is secured to guide 20 slidably mounted in the counter bore. A helical spring 21 is mounted in the counter bore and bears against shoulder 19 at one end and guide 20 at the other, to provide a resilient shock absorbing connection between the antenna wire and spinner assembly. The outer surface of stem portion 16 is threaded at 41. Nut 22 is screwed on the threaded stem portion to retain guide 20 in the counterbore. Bearings 23 and 24 are mounted on the stem portion 16. Bearing 23 is positioned between shoulder 25 on the stepped stem portion 16 and spacer ring 26 mounted on the stem portion. Bearing 24 is spaced from bearing 23 by spacer 26 and is fixed in position between spacer 26 and washer 27. The bearings, spacers and washers are locked in position by nut 22.

Figure 2:
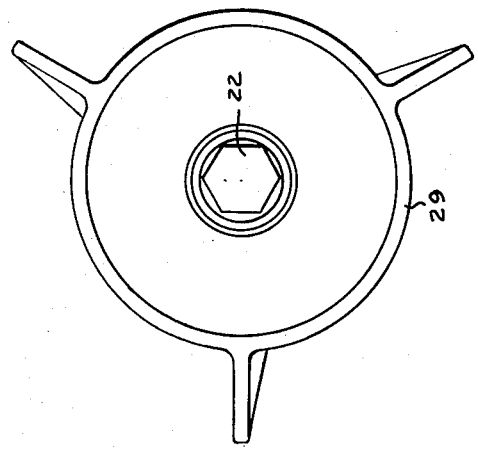
Fig. 2 is a rear view of the invention of Fig. 1.

Member 14 rotatable on member 13 comprises a cylindrical tubular forward stem portion 28 and a coaxial rearwardly extending substantially conical portion 29. The tubular portion includes an axial stem receiving bore 30 and a coaxial counterbore 31 forming annular shoulders 32. The inner surface 33 of shoulder 32 is coplanar with surface 34 of shoulder 25 and provides a means for positioning bearings 23 and 24 on member 13. Bearings 23 and 24 engage the inner surface of tubular stem portion 28 and the outer surface of stem portion 16 to permit member 14 to freely rotate on member 13. Three fins 35 substantially triangular in shape are mounted on the conical portion 29 of member 14. One edge of each fin lies in the plane of the conical base. Another edge extends along the surface of the conical portion to a point adjacent the vertex. The fins are spaced on the periphery of the cone 120° apart and at an angle of 6° as seen in Fig. 2. Fluid moving past the fins causes member 14 to rotate. The mass of member 14 is sufficiently large and is so distributed with respect to its axis of rotation that its rotation creates an effective gyroscopic damping of any sudden erratic changes in direction.

The modification of Fig. 3 discloses applicant's invention adapted for use in the refueling device. The device comprises a refueling hose and a spinner assembly. Flexible refueling hose 50 is adapted to be wound on a reel secured to a vehicle and has a trailing free end 51. The spinner assembly comprises relatively rotatable members 52 and 58. The free end of the flexible hose is secured to member 52. Member 52 comprises a forward substantially conical portion and a rearwardly extending tubular cylindrical coaxial stem portion and constitutes an extension of the fuel line. The stem portion is threaded at 53. Radial thrust bearings 54 and 55 are mounted on the stem portion in the same way as in the antenna spinner assembly described above. Member 56 rotatably mounted on member 52 comprises a forward radially tapered portion 57 and a coaxial rearwardly extending conical portion 58. Portion 57 is axially bored at 59 to receive the stem of portion 52 and counterbored at 60 to form shoulders 61. Member 56 is moved on the stem of member 52 until shoulder 61 engages flanges 62 on support 52. Bearings 54 and 55 are fixed in position between shoulders 61 at one end of the stem portion and nut 67 threaded on the stem at 53 at the other end, as described in the antenna spinner assembly. The nut 67 has a conically diverging rear portion 63 and has the double function of retaining the bearings and member 56 on the stem portion, and guiding refueling nozzle 64 shown in Fig. 4 into alignment with the refueling passage 65. Three fins 66 are mounted on the conical portion 58 in the same manner as described in the antenna spinner assembly. The mass of rotating member 56 is sufficiently large and is so distributed with respect to its axis of rotation, see Fig. 3, that its rotation creates an effective gyroscopic damping of any sudden erratic changes in direction.

Although preferred embodiments for carrying out the principle of the invention have been described, it is to be understood that modifications may be made therein without departing from the broader spirit and scope thereof as expressed in the appended claims.

I claim:

1. In a refueling device, a flexible fuel line including a trailing free end adapted to trail behind a vehicle moving through a fluid, a spinner assembly including first and second members, said trailing free end connected to said first member to provide a connecting extension for the fuel line, said second member rotatably connected to said first member, means on said second member for producing a rapid rotation of said second member, said rotating second member having a mass sufficiently large and so distributed with respect to its axis of rotation that the gyroscopic forces produced are large enough to effectively damp erratic movements of the fuel line produced by turbulent fluid pressures acting on it, and means on said spinner assembly for guiding the nozzle of the object to be refueled into connection with said flexible fuel line.

2. A trailing body for an airplane comprising a supporting hub member having means for connection at the center of its front end to a flexible trailing member from an aircraft, said hub member having a concentric reduced cylindrical extension projecting from its rear end, a gyroscopic spinner member rotatably journaled on said rearward extension, said spinner member having a rearwardly extending conical wall concentrically surrounding the axis of rotation thereof and formed with a similar concentric conical interior cavity, a plurality of fins extending from the outer surface of said spinner member of substantially triangular configuration and disposed in similar inclined relation to radial planes through the axis of rotation of the spinner, said fins having their apex portions disposed adjacent the forward end of the spinner member and their base portions adjacent the rear ends of said spinner member.

3. Apparatus as claimed in claim 2 in which said hub member has a central free passage therethrough opening into the interior of the cavity of the spinner member, and said trailing member comprises a flexible conduit disposed concentric with said central free passage.

4. In a refueling device, a flexible fuel line including a trailing free end adapted to trail behind a vehicle moving through a fluid, a spinner assembly including first and second members, said first member including a forward tubular portion and a rearwardly extending tubular stem portion, said second member including a forward tubular stem portion and a rearwardly extending conical portion, said trailing free end connected to said forward tubular portion of said first member to provide a connecting extension for the fuel line, said second member rotatably connected to said first member, bearing means mounted on said rearward tubular stem portion of said first member, said bearing means rotatably supporting the forward tubular stem portion of said second member, a plurality of blades mounted on the rearward conical portion of said second member in such a way that the movement of fluid past said blades produces a rapid rotation of said second member, said rotating second member having a mass in the rearwardly extending conical portion sufficiently large and so distributed with respect to its axis of rotation that the gyroscopic forces produced are large enough to effectively damp erratic movements of the fuel line produced by turbulent fluid pressures acting on it, and means on said spinner assembly for guiding the nozzle of the object to be refueled into connection with said flexible fuel line.

5. In a refueling device, a flexible fuel line including a trailing free end adapted to trail behind a vehicle moving through a fluid, a spinner assembly including first and second members, said first member including a forward tubular portion and a rearwardly extending tubular stem portion, said second member including a forward tubular stem portion and a rearwardly extending conical portion, said trailing free end connected to said forward tubular portion of said first member to provide a connecting extension for the fuel line, said second member rotatably connected to said first member, bearing means mounted on said rearward tubular stem portion of said first member, said bearing means rotatably supporting the forward tubular stem portion of said second member, a nut in threaded engagement with the tubular stem portion of said first member to retain said bearing means and said second member in position on said stem, said nut including a projecting conical portion for guiding a refueling nozzle into connection with the fuel line, and a plurality of blades mounted on the rearward extending conical portion of said second member in such a way that the movement of fluid past the blades produces a rapid rotation of said second member, said rotating second member having a mass in said rearwardly extending conical portion sufficiently large and so distributed with respect to its axis of rotation that the gyroscopic forces produced are large enough to effectively damp erratic movements of the fuel line produced by turbulent fluid pressures acting on it.

References Cited in the file of this patent

UNITED STATES PATENTS

| | | |
|---|---|---|
| 1,893,287 | Jenkins | Jan. 3, 1933 |
| 2,078,816 | Shenitz | Apr. 27, 1937 |
| 2,123,648 | Cabham | July 12, 1938 |
| 2,166,575 | Atcherley | July 8, 1939 |
| 2,287,257 | Lear | June 23, 1942 |
| 2,432,371 | Berberich | Dec. 9, 1947 |
| 2,440,737 | Cawein | May 4, 1948 |
| 2,525,332 | Alger et al. | Oct. 10, 1950 |
| 2,582,609 | Steele | Jan. 15, 1952 |

FOREIGN PATENTS

| | | |
|---|---|---|
| 1,992 | Great Britain | 1888 |